United States Patent Office 3,043,746
Patented July 10, 1962

3,043,746
2-(4-BIPHENYLYL)-Δ⁴-HEXENOIC ACID AND DERIVATIVES AS ANTICHOLESTERINEMIC AGENTS
Guido Cavallini and Elena Massarani, Milan, Italy, assignors to Francesco Vismara S.p.A., Como, Italy
No Drawing. Filed Nov. 2, 1959, Ser. No. 850,033
16 Claims. (Cl. 167—65)

The present invention relates to new organic compounds and is more particularly concerned with 2-(4-biphenylyl)-Δ⁴-hexenoic acid and the metal salts, esters and amide thereof, which are useful as anticholesterinemic agents.

The novel 2-(4-biphenylyl)-Δ⁴-hexenoic acid of the present invention is represented by the following formula:

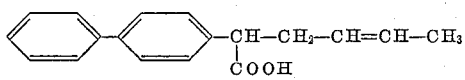

The corresponding esters of this invention are represented as follows:

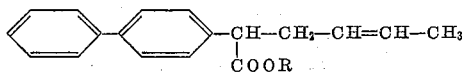

wherein R represents an aliphatic hydrocarbon radical. By the term "aliphatic hydrocarbon radical" we mean a straight or branched alkyl or alkenyl hydrocarbon radical containing from one to ten carbon atoms, inclusive. Of particular interest are the aliphatic hydrocarbon radicals chosen from the group consisting of:

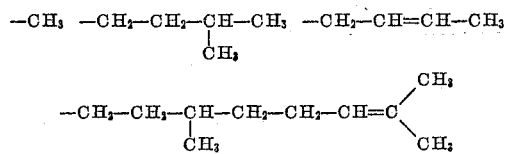

The metal salts of 2-(4-biphenylyl)-Δ⁴-hexenoic acid of this invention are advantageously those containing a pharmaceutically acceptable metal anion such as alkali metal or alkaline earth metal salts, for example sodium, potassium, calcium and magnesium salts.

It is a further object of this invention to provide anticholesterinemic compositions comprising 2-(4-biphenylyl)-Δ⁴-hexenoic acid or a metal salt, ester or amide thereof which are orally active and produce anticholesterinemia and antilipaemia.

The 2-(4-biphenylyl)-Δ⁴-hexenoic acid and the metal salts, esters and amide thereof, advantageously in the form of the novel compositions and administered according to the method of this invention, are capable of lowering hypercholesterolaemia and hyperlipaemia induced in rats by administration of Triton W.R. 1339 and in chicks by feeding with a cholesterol-rich diet, and also inhibit the deposition of lipids and cholesterol at the level of the thoracic aorta.

The compounds of this invention, employed in the novel compositions and administered as hereinafter outlined, are orally active at doses far lower than other anticholesterinemic drugs; they show a more remarkable action when compared with other anticholesterinemic drugs, because they reduce cholesterolaemia to even more than 50%.

The 2-(4-biphenylyl)-Δ⁴-hexenoic acid of the present invention may be prepared by complete hydrolysis of 2-(4-biphenylyl)-Δ⁴-hexenoic acid nitrile, accomplished under catalysis with either an acid or a base, according to prior art procedure for converting a nitrile to a corresponding carboxylic acid. If a mineral acid is employed for hydrolysis, i.e. hydrochloric acid, the ammonia formed in the reaction is bound as ammonium chloride, whereas on alkaline hydrolysis ammonia is liberated and the 2-(4-biphenylyl)-Δ⁴-hexenoic acid is obtained by acidification of the reaction mixture containing the alkali salt.

The 2-(4-biphenylyl)-Δ⁴-hexenoic acid nitrile is prepared, in its turn, by condensation of 4-biphenylyl acetonitrile (obtained by interaction of 4-biphenylyl methyl chloride with sodium or potassium cyanide in aqueous-alcoholic solution) with crotyl bromide, in the presence of a condensing agent such as sodium amide or sodium methoxide.

Alternatively, 2-(4-biphenyl)-Δ⁴-hexenoic acid can be prepared from 4-biphenylyl acetonitrile by alcoholysis in the presence of methanol or ethanol and condensation of the 4-biphenylyl acetic acid methyl or ethyl ester thus obtained with crotyl bromide followed by hydrolysis of the resulting 2-(4-biphenylyl)-Δ⁴-hexenoic acid methyl or ethyl ester. By ammonolysis of these esters, 2-(4-biphenylyl)-Δ⁴-hexenoic acid amide is easily obtained.

The 2-(4-biphenylyl)-Δ⁴-hexenoic acid esters of the present invention can be prepared from the 2-(4-biphenylyl)-Δ⁴-hexenoic acid by first replacing the hydroxyl group of the acid with chlorine, by treatment with thionyl chloride or phosphorus pentachloride, and then condensing 2-(4-biphenyl)-Δ⁴-hexenoic acid chloride with the desired alcohol.

The metal salts of 2-(4-biphenylyl)-Δ⁴-hexenoic acid of this invention are prepared by treatment of the acid with the appropriate metal hydroxide according to standard procedures for acid salt formation.

The compositions of this invention are in dosage unit form comprising a nontoxic pharmaceutical carrier and the 2-(4-biphenylyl)-Δ⁴-hexenoic acid or the metal salt, ester or amide thereof. The nontoxic pharmaceutical carrier may be, for example, either a solid or a liquid. Exemplary of solid carriers are lactose, starch, gelatin, talc, stearic acid, magnesium stearate, terra alba, sucrose, agar, pectin and acacia. Exemplary of liquid carriers are peanut oil, olive oil, sesame oil and water. Similarly the carrier or diluent may include a time delay material such as glyceryl monostearate or glyceryl distearate alone or with a wax.

Several pharmaceutical forms of the therapeutically useful compositions can be used. For example, if a solid carrier is used the compositions may take the form of tablets, linguets, powders, capsules, troches or lozenges, prepared by standard pharmaceutical techniques. If a liquid carrier is used, the preparation may be in the form of a soft gelatin capsule, a syrup or a liquid suspension.

The 2-(4-biphenylyl)-Δ⁴-hexenoic acid or the metal salt, ester or amide thereof in the compositions of this invention is present in an amount sufficient to produce anticholesterinemia, that is reduce cholesterol and lipid levels. Advantageously the composition will contain the 2-(4-biphenylyl)-Δ⁴-hexenoic acid or the metal salt, ester or amide thereof in an amount of from about 15 mg. to about 500 mg., preferably from about 25 mg. to about 300 mg. per dosage unit.

The method of this invention comprises internally administering in an amount sufficient to produce anticholesterinemia 2-(4-biphenylyl)-Δ⁴-hexenoic acid or the metal salt, ester or amide thereof admixed with a nontoxic pharmaceutical carrier such as exemplified above. The 2-(4-biphenylyl)-Δ⁴-hexenoic acid or the metal salt, ester or amide thereof advantageously will be in an amount of from about 15 mg. to about 500 mg. and preferably from about 25 mg. to about 300 mg. The administration is by the oral route, advantageously in equal doses one to three or four times daily to give a daily dosage of from about 45 mg. to about 1500 mg. and preferably from about 100 mg. to about 1000 mg. The most rapid and effective anticholesterinemic effect is obtained upon oral administration of a daily dosage of from about 300 mg. to about 900 mg.

The preferred compositions of this invention comprise 2-(4-biphenylyl)-$\Delta^4$-hexenoic acid and a nontoxic pharmaceutical carrier.

The following examples are illustrative of the compounds, compositions and method of the present invention, but are not to be construed as limiting.

EXAMPLE 1

2-(4-Biphenylyl)-$\Delta^4$-Hexenoic Acid

In a three-necked flask fitted with a reflux condenser carrying a tube containing calcium chloride, a dropping funnel and a mechanical stirrer, were placed 19.21 g. (0.1 mole) of 4-biphenylyl-acetonitrile, 65 cc. of anhydrous ether and 4.7 g. (0.12 mole) of sodium amide, previously ground. The mixture was refluxed, under stirring, for one hour, then 16.1 g. (0.12 mole) of crotyl bromide were added drop by drop with stirring and the whole gently refluxed for six hours.

After the mixture was allowed to stand overnight at room temperature, ether was decanted in a separatory funnel. To the residue in the flask a small amount of water was added and the solution poured into the separatory funnel together with the ether. After acidification with dilute hydrochloric acid, the ethereal layer was separated, dried over anhydrous sodium sulfate and evaporated to dryness.

The oily residue was distilled at 165–168° C./0.5 mm. Yield 20 g. (80%) of pure 2-(4-biphenylyl)-$\Delta^4$-hexenoic acid nitrile.

Analysis.—Calculated for $C_{18}H_{17}N$: N, 5.66. Found: N, 5.80.

In a two-necked flask fitted with a mechanical stirrer and a reflux condenser were placed 24.7 g. (0.1 mole) of 2-(4-biphenylyl)-$\Delta^4$-hexenoic acid nitrile, 56 g. (1 mole) of potassium hydroxide, 50 cc. of water and 100 cc. of ethanol. The reaction mixture was refluxed with stirring for 40 hours, after which ethanol was distilled and 500 cc. of water added. The aqueous solution was extracted with ether to eliminate the unsaponified nitrile, then acidified with hydrochloric acid to Congo red and repeatedly extracted with ether.

The ethereal extracts were washed with water up to neutrality and dried over anhydrous sodium sulfate. After removal of the drying agent by filtration, the solvent was evaporated to obtain 2-(4-biphenylyl)-$\Delta^4$-hexenoic acid as a white crystalline product.

Recrystallization from 80% acetic acid gave 16 g. (60%) of pure product melting at 118° C.

Analysis.—Calculated for $C_{18}H_{18}O_2$: C, 81.16; H, 6.81. Found: C, 81.16; H, 6.80.

EXAMPLE 2

38 g. of 4-biphenylyl acetonitrile, 65 g. of 95% ethyl alcohol and 60 g. of sulfuric acid were poured into a three-necked flask and the mixture was refluxed for six hours. After cooling, the oily layer containing almost all the resulting ester, was separated from the water saline suspension. (If desired, it is possible to extract with methylene chloride the saline suspension previously diluted with water. In this case the methylene chloride extracts should be washed, before concentration, with an aqueous solution of sodium carbonate, in order to eliminate the biphenylyl acetic acid not esterified which might be present.) The oil was distilled under vacuum, and the fraction boiling at 145–154° C. under 0.2 mm. (165–167° C./0.5 mm.) was collected. Yield 39 g. (88% of the theoretical) of the ethyl ester of 4-biphenylyl acetic acid.

160 cc. of anhydrous dioxane and 9.6 g. of sodium hydride (a 50% suspension in oil) were placed in a suitable flask. A nitrogen stream was passed over, in order to eliminate completely the air, and it was maintained also during the reaction. To the mixture heated at 75° C., 48 g. of ethyl biphenylyl acetate and 27 g. of crotyl bromide were added drop by drop. The temperature rose quickly to approximately 90° C. where it remained throughout the addition of crotyl bromide (about an hour and a half). Little by little the reaction mixture became thicker and stirring more difficult. The mixture was refluxed for three hours, then cooled, and the sodium bromide which had formed was filtered off. The precipitate was washed with 20 cc. of dioxane and finally all the solvent was distilled off, thus obtaining, in the form of an oil, the ethyl ester of 4-biphenylyl-$\Delta^4$-hexenoic acid. Yield 54 g. (equal to 90% of the theoretical). The crude product thus obtained was dissolved in 100 cc. of 95% alcohol. A solution of 25 g. of potassium hydroxide in 120 cc. of water was added. The reaction mixture was refluxed for five hours, then concentrated to half volume, in order to remove most of the alcohol. The concentrate was slowly acidified with 15% hydrochloric acid, and the solution was kept perfectly cold, in order to avoid the formation of oil. Then the precipitate which had formed was filtered and washed with water and, after drying crystallized from dilute acetic acid. 2-(4-biphenylyl)-$\Delta^4$-hexenoic acid was obtained with a M.P. 119–121° C.

EXAMPLE 3

Esters of 2-(4-Biphenylyl)-$\Delta^4$-Hexenoic Acid

In a three-necked flask equipped with a mechanical stirrer, a dropping funnel and a reflux condenser carrying a tube containing calcium chloride, were placed 26.6 g. (0.1 mole) of 2-(4-biphenylyl)-$\Delta^4$-hexenoic acid. 118 g. (1 mole) of thionyl chloride was added drop by drop with stirring at room temperature.

The mixture was stirred again for one hour, always at room temperature. The thionyl chloride excess was eliminated at reduced pressure and to the residue, constituted of 2-(4-biphenylyl)-$\Delta^4$-hexenoic acid chloride, 32 g. (1 mole) of anhydrous methanol was added. The mixture was heated for one hour under stirring, then cooled and taken up with ether. The extract was washed at first with a 5% sodium carbonate solution then with water up to neutrality, dried and evaporated in vacuo.

The oily residue was distilled in the vacuum. The methyl ester of 2-(4-biphenylyl)-$\Delta^4$-hexenoic acid distills at 140–141° C./0.2 mm.; yield 60% of the theoretical amount.

Analysis.—Calculated for $C_{19}H_{20}O_2$: C, 81.39; H, 7.19. Found: C, 81.23; H, 7.14.

In the same manner as above, other esters of 2-(4-biphenylyl)-$\Delta^4$-hexenoic acid were obtained, by reacting 2-(4-biphenylyl)-$\Delta^4$-hexenoic acid chloride with the appropriate alcohol.

Properties of some representative esters of 2-(4-biphenylyl)-$\Delta^4$-hexenoic acid are as follows:

| Esters | Yield, percent | B.P., °C | Formula | Calc., percent | | Calc., percent | |
|---|---|---|---|---|---|---|---|
| | | | | C | H | C | H |
| Crotyl | 56 | 161–163/0.4 mm | $C_{22}H_{24}O_2$ | 82.46 | 7.55 | 81.91 | 7.52 |
| Isoamyl | 70 | 163/0.2 mm | $C_{23}H_{28}O_2$ | 82.10 | 8.39 | 82.70 | 8.29 |
| Citronellyl | 40 | 195–200/0.4 mm | $C_{28}H_{36}O_2$ | 83.12 | 8.97 | 82.27 | 8.26 |

EXAMPLE 4

A solution of 2.7 g. of 2-(4-biphenylyl)-Δ⁴-hexenoic acid in 25 ml. of ether is treated with 0.4 g. of sodium hydroxide (one equivalent) dissolved in 25 ml. of water. The aqueous layer is separated, washed with ether and evaporated to dryness to give sodium 2-(4-biphenylyl)-Δ⁴-hexenoate.

Similarly, by employing equivalent amounts of other alkali metal or alkaline earth metal hydroxides, the corresponding salts of 2-(4-biphenylyl)-Δ⁴-hexenoic acid are obtained, for example the potassium, calcium and magnesium salts.

EXAMPLE 5

A solution of 5.6 g. of the methyl ester of 2-(4-biphenylyl)-Δ⁴-hexenoic acid in 25 ml. of methanol is treated with an excess of aqueous ammonia. The solution is concentrated and cooled to give the 2-(4-biphenylyl)-Δ⁴-hexenoic acid amide.

EXAMPLE 6

Pharmacological Testing With Rats 2-(4-biphenylyl)-Δ⁴-hexenoic acid and some of its esters were examined in order to test their capacity of lowering high blood levels of lipids and cholesterol. Such an examination was carried out in rats showing hypercholesterolaemia and hyperlipaemia induced by administration of Triton W.R. 1339 (a high polymer of p-isooctylpolyoxy-ethylenphenol), according to M. Friedman and S. O. Byers procedure (J. Exp. Med. 97, 117, 1953).

Male rats, weighing about 250 g., fasting since 24 hours, were injected intravenously with 200 mg./kilo of Triton. The animals were sacrificed 18 hours after the administration of Triton; the blood level of cholesterol was determined according to D. M. Colman and A. F. McPhee (Am. J. Clin. Path. 26, 181, 1956) and that of total lipids according to J. H. Bragton (J. Biol. Chem. 190, 513, 1951).

The substances under examination were administered by oral route, immediately after the injection of Triton. 2-(4-biphenylyl)-Δ⁴-hexenoic acid at the dose of 80 mg. produced a 20% reduction of cholesterol. The reduction reached 56% by administration of 320 mg. The behaviour of the esters did not differ from that of the acid.

The oral anticholesterinemic and antilipaemic activity of the 2-(4-biphenylyl)-Δ⁴-hexenoic acid and its isoamyl ester

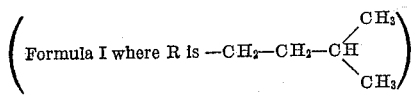

$$\left(\text{Formula I where R is } -CH_2-CH_2-CH\begin{matrix}CH_3\\ \\CH_3\end{matrix}\right)$$

was compared with that of 4-biphenylyl ethylacetic acid which shows, as known, a marked anticholesterinemic activity. Results of biological testing are summarized in the Table I.

From the table, it can be seen that 2-(4-biphenylyl)-Δ⁴-hexenoic acid is more active than 4-biphenylyl-ethyl-acetic acid both as a hypocholesteremic and hypolipaemic agent. The esterification of 2-(4-biphenylyl)-Δ⁴-hexenoic acid with isoamyl alcohol does not modify substantially its activity.

EXAMPLE 7

Pharmacological Testing With Chicks

As to the assays carried out in chicks, the procedure suggested by D. M. Peterson (J. Nutrition 47, 57, 1952), was followed. Forty days aged female white Leghorn were fed over one month period with a basal diet added with 2% of cholesterol and 5% of sesame oil. Then the chicks were divided into groups. A group served as a control, two groups received respectively 4-biphenylyl ethyl acetic acid and 2-(4-biphenylyl)-Δ⁴-hexenoic acid, mixed with the basal diet, in such amounts as every chick received 50 mg. per kilo a day of the product under examination. The treatment lasted one month.

At the end of this second month the chicks were sacrificed and, cholesterol, liver and thoracic aortas lipides were determined, according to the previously mentioned procedures.

Tables II and III show the data of the assay.

TABLE II

| Treatment | Animals, No. | Serum total cholesterol, mg./percent | Variations, percent | Serum total lipides, mg./percent | Variations, percent |
|---|---|---|---|---|---|
| Controls | 8 | 2,303 | --------- | 3,630 | --------- |
| 4-biphenylyl ethyl acetic acid | 10 | 2,421 | +5.12 | 3,960 | +9.09 |
| 2-(4-biphenylyl) Δ⁴-hexenoic acid | 10 | 1,299 | −43.50 | 1,980 | −45.4 |

TABLE III

| Treatment | Animals, No. | Total cholesterol in mg./g of dried substance | Variations, percent | Total lipides in mg./g. of dried substance | Variations, percent |
|---|---|---|---|---|---|
| Controls | 8 | 3.210 | --------- | 28.526 | --------- |
| 4-biphenylyl ethyl acetic acid | 10 | 3.199 | 0 | 24.690 | −13.4 |
| 2-(4-biphenylyl) Δ⁴-hexenoic acid | 10 | 2.150 | −33 | 21.944 | −23 |

From these data too, it appears clearly that 2-(4-biphenylyl)-Δ⁴-hexenoic acid has a distinctive superiority for its hypocholesteremic and hypolipaemic action as well as for its capacity of lowering lipides and cholesterol content in aorta tissue.

TABLE I

| Treatment | Mole/kilo per os | No. of rats | Serum total cholesterol, mg/100 cc. | Variations, percent | Serum total lipides, mg/100 cc. | Variations, percent |
|---|---|---|---|---|---|---|
| Controls | --------- | 180 | 192.12 | --------- | 1,370.34 | --------- |
| 2-(4-biphenylyl)-Δ⁴-hexenoic acid | 0.0003 | 50 | 180.95 | −5.8 | 1,244.70 | −9.1 |
|  | 0.0006 | 100 | 152.40 | −20.6 | 1,016.67 | −25.8 |
|  | 0.0012 | 50 | 108.65 | −43.4 | 601.91 | −56.0 |
| Iso-amyl ester | 0.0003 | 16 | 168.2 | −12.4 | 1,090 | −20.4 |
|  | 0.0006 | 16 | 162.3 | −15.5 | 901 | −34.2 |
|  | 0.0012 | 16 | 153.5 | −20.1 | 760 | −44.5 |
| 4-biphenylyl-ethyl acetic acid | 0.0003 | 50 | 187.21 | −2.5 | 1,365.70 | −0.33 |
|  | 0.0006 | 100 | 160.83 | −16.2 | 1,094.56 | −20.1 |
|  | 0.0012 | 50 | 159.30 | −17.0 | 1,119.85 | −18.2 |

EXAMPLE 8

An oral composition was prepared from the following components:

| | Mg. |
|---|---|
| 2-(4-biphenylyl)-Δ⁴-hexenoic acid | 100 |
| Placebo granules | 125 |
| Talc | 15 |
| Magnesium stearate | 10 |

The placebo granules were made of 64% lactose and 36% rich starch, 2-(4-biphenylyl)-Δ⁴-hexenoic acid, screened through 20 mesh, was added and the adjuvants, talc and magnesium stearate were added. Tableting was done on a rotary machine.

EXAMPLE 9

Tablets were prepared with the following components:

| | Mg. |
|---|---|
| 2-(4-biphenylyl)-Δ⁴-hexenoic acid | 75 |
| Cornstarch | 40 |
| Lactose | 75 |
| Talc | 6 |
| Stearic acid | 4 |
| Sugar coating, approximately | 30 |

EXAMPLE 10

Linguets were obtained by combining the following components:

| | Mg. |
|---|---|
| 2-(4-biphenylyl)-Δ⁴-hexenoic acid methyl ester | 25 |
| Lactose | 50 |
| Confectioner's sugar | 60 |
| Stearin | 2 |
| Talc | 13 |

Similarly, 30 mg. of 2-(4-biphenylyl)-Δ⁴-hexenoic acid isoamyl ester may be substituted in the above composition.

EXAMPLE 11

| | Mg. |
|---|---|
| Sodium salt of 2-(4-biphenylyl)-Δ⁴-hexenoic acid powder | 75 |
| Placebo granules (60% lactose and 40% rich-starch) | 145 |
| Talc | 20 |
| Stearic acid | 6 |
| Calcium carbonate | 4 |

EXAMPLE 12

An oral composition was prepared from the following components:

| | Mg. |
|---|---|
| 2-(4-biphenylyl)-Δ⁴-hexenoic acid | 15 |
| Cornstarch | 30 |
| Lactose | 50 |
| Talc | 3 |
| Magnesium stearate | 2 |

EXAMPLE 13

| | Mg. |
|---|---|
| 2-(4-biphenylyl)Δ⁴-hexenoic acid amide | 100 |
| Magnesium stearate | 10 |
| Lactose | 300 |

The above ingredients are screened, mixed and filled into hard gelatin capsules.

EXAMPLE 14

| | Mg. |
|---|---|
| 2-(4-biphenylyl)-Δ⁴-hexenoic acid | 50 |
| Peanut oil | 250 |

The above ingredients are mixed to a slurry and filled into soft gelatin capsules.

EXAMPLE 15

| | Mg. |
|---|---|
| 2-(4-biphenylyl)-Δ⁴-hexenoic acid | 200 |
| Magnesium stearate | 5 |
| Lactose | 250 |

EXAMPLE 16

| | Mg. |
|---|---|
| 2-(4-biphenylyl)-Δ⁴-hexenoic acid | 300 |
| Cornstarch | 50 |
| Lactose | 100 |
| Talc | 10 |
| Magnesium stearate | 6 |

This application is a continuation-in-part of application Serial No. 728,108, filed April 14, 1958, now abandoned.

What is claimed is:

1. A chemical compound selected from the group consisting of (a) 2-(4-biphenylyl)-Δ⁴-hexenoic acid having the formula:

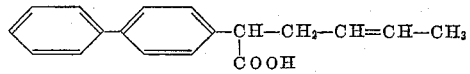

(b) alkali metal salts thereof; (c) alkaline earth metal salts thereof; (d) esters thereof having the formula:

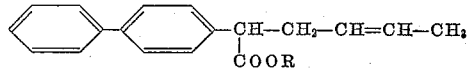

in which R is a member selected from the group consisting of an alkyl radical containing from 1 to 10 carbon atoms inclusive and an alkenyl radical containing from 1 to 10 carbon atoms inclusive; and (e) 2-(4-biphenylyl)-Δ⁴-hexenoic acid amide.

2. 2-(4-biphenylyl)-Δ⁴-hexenoic acid.
3. 2-(4-biphenylyl)-Δ⁴-hexenoic acid sodium salt.
4. 2-(4-biphenylyl)-Δ⁴-hexenoic acid methyl ester.
5. 2-(4-biphenylyl)-Δ⁴-hexenoic acid crotyl ester.
6. 2-(4-biphenylyl)-Δ⁴-hexenoic acid isoamyl ester.
7. 2-(4-biphenylyl)-Δ⁴-hexenoic acid citronellyl ester.
8. 2-(4-biphenylyl)-Δ⁴-hexenoic acid amide.
9. A composition having anticholesterinemic activity comprising a pharmaceutical carrier and a compound selected from the group consisting of (a) 2-(4-biphenylyl)-Δ⁴-hexenoic acid having the formula:

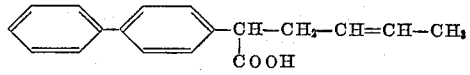

(b) metal salts thereof selected from the group consisting of alkali metal and alkaline earth metal salts; (c) esters thereof having the formula:

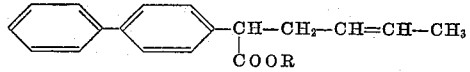

in which R is a member selected from the group consisting of an alkyl radical containing from 1 to 10 carbon atoms inclusive and an alkenyl radical containing from 1 to 10 carbon atoms inclusive; and (d) 2-(4-biphenylyl)-Δ⁴-hexenoic acid amide.

10. A composition having anticholesterinemic activity comprising a pharmaceutical carrier and 2-(4-biphenylyl)-Δ⁴-hexenoic acid.

11. An anticholesterinemic composition in dosage unit form comprising as active ingredient a compound selected from the group consisting of (a) 2-(4-biphenylyl)-Δ⁴-hexenoic acid having the formula:

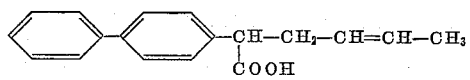

(b) alkali metal salts thereof; (c) alkaline earth metal salts thereof; (d) esters thereof having the formula:

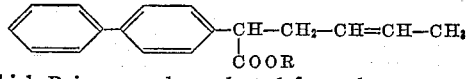

in which R is a member selected from the group consisting of an alkyl radical containing from 1 to 10 carbon atoms inclusive and an alkenyl radical containing from 1 to 10 carbon atoms inclusive; and (e) 2-(4-biphenylyl)-Δ⁴-hexenoic acid amide, each said dosage unit containing from about 15 mg. to about 500 mg. of said active ingredient in association with a nontoxic pharmaceutical carrier.

12. A composition as claimed in claim 11 containing from about 25 mg. to about 300 mg. of said active ingredient.

13. A composition as claimed in claim 11 in which said active ingredient is 2-(4-biphenylyl)-Δ⁴-hexenoic acid.

14. A method of reducing the blood cholesterol level in humans comprising orally administering daily doses of from about 45 mg. to about 1500 mg. of a compound selected from the group consisting of (a) 2-(4-biphenylyl)-Δ⁴-hexenoic acid having the formula:

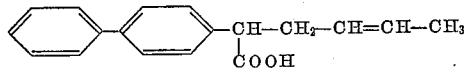

(b) alkali metal salts thereof; (c) alkaline earth metal salts thereof; (d) esters thereof having the formula:

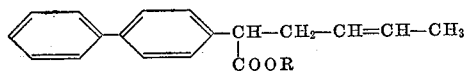

in which R is a member selected from the group consisting of an alkyl radical containing from 1 to 10 carbon atoms inclusive and an alkenyl radical containing from 1 to 10 carbon atoms inclusive; and (e) 2-(4-biphenylyl)-Δ⁴-hexenoic acid amide.

15. A method as claimed in claim 14 in which there is administered from about 300 mg. to about 900 mg. of said compound.

16. A method as claimed in claim 14 in which said compound is 2-(4-biphenylyl)-Δ⁴-hexenoic acid.

References Cited in the file of this patent
UNITED STATES PATENTS

| | | |
|---|---|---|
| 2,410,040 | Blicke | Oct. 29, 1946 |
| 2,595,200 | Miescher et al. | Apr. 29, 1952 |
| 2,619,499 | Kimmel | Nov. 25, 1952 |

OTHER REFERENCES

Cavallini: JACS, vol. 79, July 5, 1957, pp. 3514–3517.
Blicke: JACS, vol. 65, 1943, pp. 1725–8.
Garattini: Arch. Int. Pharmacodyn., CIX, Nos. 3–4, 1957, pp. 400–414.